(12) United States Patent
Sullivan et al.

(10) Patent No.: US 6,721,538 B1
(45) Date of Patent: Apr. 13, 2004

(54) TIME-OFFSET DISTRIBUTION TO ENSURE CONSTANT SATELLITE POWER

(75) Inventors: John Sullivan, Manhattan Beach, CA (US); David Roos, Boyds, MD (US); Michael Parr, Del Mar, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 600 days.

(21) Appl. No.: 09/678,681

(22) Filed: Oct. 5, 2000

(51) Int. Cl.$^7$ ................................................ H04B 7/19
(52) U.S. Cl. ..................... 455/13.2; 455/3.02; 455/12.1; 455/13.4; 455/427
(58) Field of Search ............................... 455/3.02, 12.1, 455/13.2, 13.4, 51.1, 98, 208, 427, 502, 522, 430; 370/100.1, 324, 350, 395.62, 503, 507

(56) References Cited

U.S. PATENT DOCUMENTS

| | | | |
|---|---|---|---|
| 3,982,075 A | * 9/1976 | Jefferis et al. | 370/324 |
| 4,617,674 A | * 10/1986 | Mangulis et al. | 375/141 |
| 5,430,761 A | * 7/1995 | Bruckert et al. | 375/144 |
| 5,790,939 A | * 8/1998 | Malcolm et al. | 455/13.2 |
| 5,991,716 A | * 11/1999 | Lehtimaki | 704/212 |
| 6,091,936 A | * 7/2000 | Chennakeshu et al. | 455/63.3 |
| 6,160,454 A | * 12/2000 | Buer et al. | 330/295 |
| 6,298,095 B1 | * 10/2001 | Kronestedt et al. | 375/295 |
| 6,317,453 B1 | * 11/2001 | Chang | 375/140 |
| 6,452,962 B1 | * 9/2002 | Linsky et al. | 375/145 |
| 6,501,743 B1 | * 12/2002 | Kim et al. | 370/324 |

\* cited by examiner

*Primary Examiner*—William Trost
*Assistant Examiner*—James Ewart
(74) *Attorney, Agent, or Firm*—John T. Whelan; Michael Sales

(57) ABSTRACT

An approach for minimizing variation in transmit power of synchronized signals that are destined to a satellite is disclosed. A gateway station system for communicating with a communication satellite includes a multiple signal sources which generate the synchronized signals. The gateway station system utilizes a control logic that is coupled to the signal sources. The control logic operates to offset selectively transmission times of a portion of the synchronized signals according to a predetermined distribution and an offset period. The predetermined distribution specifies about half the number of the synchronized signals are to be offset. The offset period is half a symbol period. The terminals within the satellite communication system has a receiver that receives the synchronized signal from the communication satellite. Each of the terminals also includes an offset-determination logic that is coupled to the receiver and determines whether the synchronized signals are offset based upon a received assignment message. The assignment message has a control flag field that indicates whether the received signal is offset.

23 Claims, 10 Drawing Sheets

1/2 SYMBOL

TIME-OFFSET DISTRIBUTION TO ENSURE CONSTANT SATELLITE POWER

BACKGROUND OF THE INVENTION

1. Field of the Invention

The present invention relates to satellite communication systems, and is more particularly related to a satellite transmission system.

2. Discussion of the Background

Modern satellite communication systems provide a pervasive and reliable infrastructure to distribute voice, data, and video signals for global exchange and broadcast of information. These satellite communication systems have emerged as a viable alternative to terrestrial communication systems. Another popular application is direct television broadcasting, which has provided a competitive alternative to cable television systems. Irrespective of the application, a satellite communication system must be designed to support the largest possible traffic capacity, which can translate to lower cost per telephone circuit, or television service, for example, and thus, to increased revenue for the system operator. The largest factors that affect capacity of a satellite communication system are the satellite transmission power and bandwidth.

To maximize traffic capacity, a typical satellite system employs multiple carriers within a single transponder, thereby requiring wide-band amplifiers to support the multiple carriers. However, wide-band amplifiers are particularly susceptible to intermodulation distortion when they are driven into saturation. As a practical consequence, the wide-band amplifier is driven below its peak power, which reduces traffic capacity. Therefore, it is observed that when signals from a large number of terminals are transmitted to a communication satellite, performance of the satellite communication system is limited by the satellite's ability to transmit power.

Satellite communication systems also face the challenge of maintaining proper timing, as the satellite travel in geosynchronous orbit. To minimize timing errors, the signals that are transmitted from the terminals to the satellite are synchronized. Accordingly, these signals (or carriers) are received at the satellite synchronized in time; however, the total power transmitted varies significantly over the period of a symbol (i.e., the unit of time over which individual information elements are transmitted). As a result, the satellite amplifiers are driven further into saturation than the average power would imply, thereby increasing interference due to intermodulation. FIG. 1, as discussed below, illustrates the phenomenon that arises from the synchronization of numerous carriers.

FIG. 1 shows charts of the envelopes of multiple carriers and the resulting average power. Chart 101 corresponds to a carrier, $f_1$, that is transmitted, for example, by a gateway station or a terminal. In this example, it is assumed that N carriers are received at the satellite. Graph 103 shows the envelope of the $N^{th}$ carrier. It is seen in Graph 105 that the average power of all the carriers (i.e., N carriers) produces a ±1 dB variation; that is, a peak-to-peak variation of 2 dB. Therefore, a satellite power amplifier that handles multiple carriers experiences increased signal interference and reduced efficiency of the satellite communication system.

A drawback with the traditional approach is that the implementation of a gateway or terminal that generates synchronized signals introduces power variation to the satellite, resulting in increased signal noise, thereby decreasing traffic capacity.

Based on the foregoing, there is a clear need for improved approaches for minimizing the variation in satellite transmit power.

There is also a need to increase the efficiency of the satellite system.

There is also a need to enhance transmission capacity.

Based on the need to streamline power efficiency, an approach for generating transmission signals to provide constant satellite power is highly desirable.

SUMMARY OF THE INVENTION

According to one aspect of the invention, a method is provided for minimizing variation in transmit power in a satellite communication system. The method includes generating a plurality of synchronized signals. In addition, the method encompasses selectively offsetting transmission times of a portion of the plurality of synchronized signals. Under this approach, the traffic capacity of a satellite communication system is increased.

According to another aspect of the invention, a gateway station system for communicating with a communication satellite comprises a plurality of signal sources that are configured to generate synchronized signals. A control logic is coupled to the plurality of signal sources and is configured to offset selectively transmission times of a portion of the synchronized signals. The above arrangement advantageously provides enhanced system efficiency.

According to another aspect of the invention, a terminal apparatus for communicating with a communication satellite that processes synchronized signals comprises a receiver that is configured to receive one of the synchronized signal from the communication satellite. An offset-determination logic is coupled to the receiver and is configured to determine whether the one synchronized signal is offset. The above arrangement advantageously provides reduced intermodulation interference.

In yet another aspect of the invention, a method is provided for establishing a satellite communication channel. The method includes receiving a channel establishment request message from a terminal over a random access channel (RACH) to initiate establishment of the satellite communication channel. The method also includes generating an assignment message in response to the receiving step. The assignment message has a control flag field that indicates whether a transmission signal is offset. The method further includes transmitting the assignment message to the terminal over an access grant channel (AGCH). Under this approach, system efficiency of a satellite communication system is increased.

In yet another aspect of the invention, a computer-readable medium carrying one or more sequences of one or more instructions for establishing a satellite communication channel is disclosed. The one or more sequences of one or more instructions include instructions which, when executed by one or more processors, cause the one or more processors to perform the step of receiving a channel establishment request message from a terminal over a random access channel (RACH) to initiate establishment of the satellite communication channel. Another step includes generating an assignment message in response to the receiving step. The assignment message has a control flag field that indicates whether a transmission signal is offset. Another step includes transmitting the assignment message to the terminal over an access grant channel (AGCH). This approach advantageously minimizes variation in the average power of the synchronized signals.

In yet another aspect of the invention, a memory for storing information establishing a satellite communication channel, comprises a data structure that includes a control flag field for indicating whether a transmission signal is offset according to a predetermined distribution and an offset period. Accordingly, the above approach advantageously reduces intermodulation interference.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention minimizes the variation in transmit power associated with a satellite communication system. A gateway station system includes multiple signal sources that generate synchronized signals that are destined to a communication satellite. A control logic within the gateway station system controls the signal sources to offset selectively the transmission times of a portion of the synchronized signals according to a predetermined distribution and an offset period. In an exemplary embodiment, the predetermined distribution can specify that only about half of the signal sources generate synchronized signals that are offset.

The offset period can be set to half a symbol period. The present invention also provides a terminal that communicates with the communication satellite. The terminal includes a receiver that receives the synchronized signal from the communication satellite and an offset-determination logic to determine whether a received synchronized signal is offset.

Although the present invention is discussed with respect to the ETSI (European Telecommunications Standards Institute) GSM (Global Satellite Mobile Communications) protocol and a QPSK (Quadrature Phase Shift Keying) signaling technique, other equivalent protocols and signaling techniques are applicable.

Figure 1A:
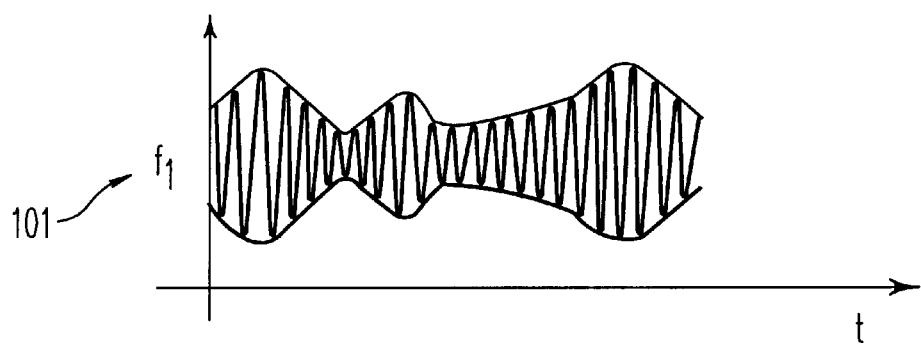
FIG. 1 is an illustration of graphs of the transmission signals generated by different signal sources and a graph representing the power of an aggregate signal.
Figure 1B:
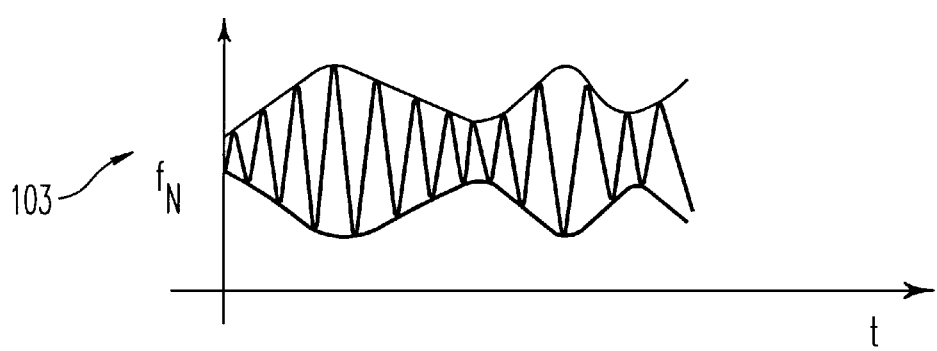
Figure 1C:
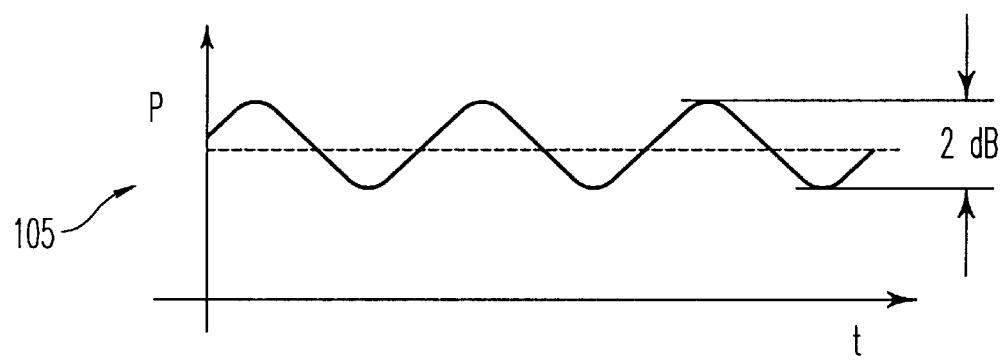
Figure 2:
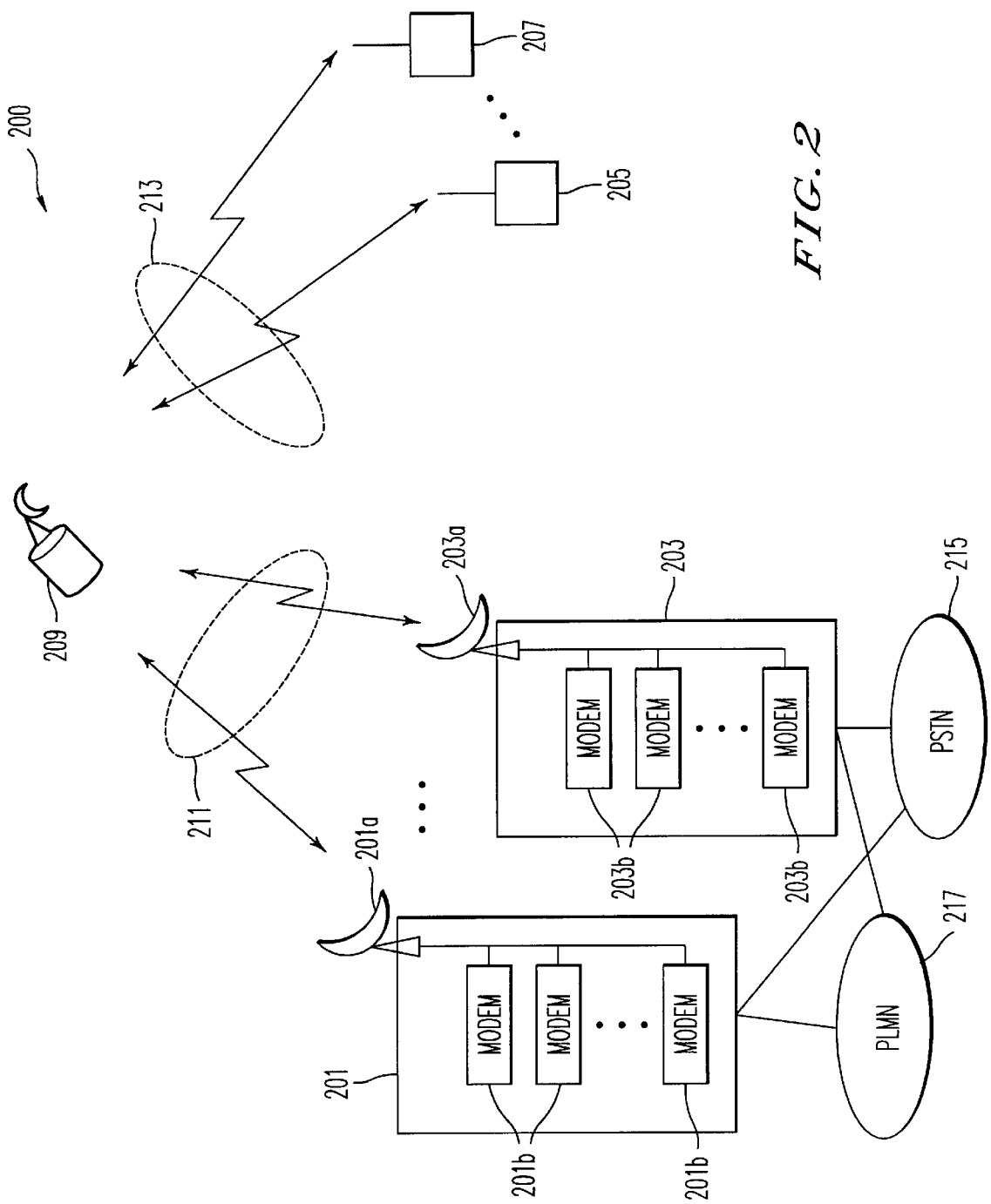
FIG. 2 is a block diagram of a satellite communication system with multiple gateway stations and terminals, in accordance with an embodiment of the present invention.

FIG. 2 shows a satellite communication system in accordance with one embodiment of the present invention. A satellite communication system 200 includes multiple gateway stations 201 and 203 and numerous terminals 205 and 207. Gateway stations 201 and 203 communicate with the terminals 205 and 207 via a communication satellite 209, in which the uplink 211 is at C-band (4–8 GHz) and a downlink 213 is at L-band (1–2 GHz). The satellite communication system 200 also supports connectivity to a public switch telephone network (PSTN) 215 and a public land mobile network (PLMN) 217 to permit the terminals 205 and 207 to communicate with various terrestrial systems.

The terminals 205 and 207 (i.e., user terminals) provide the subscriber interface to the system 200. The terminal types may include hand held, vehicular, and stationary units. Hand held terminals resemble traditional ground cellular units, which vehicular terminals include, for example, handsets that are docked to an external antenna, transmit power booster, and DC power source. Stationary terminals are equipped with directional antennas and can be configured to support a number of voice and data circuits (e.g., 1–8 circuits). Because the system 200 utilizes a protocol stack that is based on the ETSI GSM 03.20 protocol specification (which is incorporated herein by reference in its entirety), terminals 205 and 207 support this protocol stack as well. Specifically, terminals 205 and 207 support authentication, link ciphering, and user identity protection, as in the GSM 03.20 protocol. The GSM protocol is more fully discussed later with respect to FIGS. 8A and 8B.

The gateway stations 201 and 203 manage and allocate system communication resources that are necessary to support the communication traffic within their respective service areas, such as L-band spectrum and downlink EIRP (Effective Isotropically Radiated Power). For example, the gateway stations 201 and 203 can provide the following functions: management of the call set-up and tear down, generation of call records, allocation of communication resources within its service area (frequency and power), user authentication, and support of user roaming within the system coverage area.

As seen in FIG. 2, each of the gateway stations 201 and 203 utilize a pool of modems and an antenna system. For the purposes of explanation, FIG. 2 merely illustrates the components within gateway station 201 that are necessary to describe the operation of the gateway 201 in accordance with an embodiment of the present invention; these components include an antenna 201a and a pool of modems 201b. In an exemplary embodiment, the number of modems 201b may be in the order of 1,000 or more. Similarly, gateway station 203 includes an antenna 203a coupled to a pool of modems 203b. The modems 201b and 203b are essentially signal sources that can produce carriers that are synchronized in the manner discussed with respect to FIG.

1. As will be explained in FIG. 5, the present invention overcomes the average power variation that attends the conventional system by offsetting a portion of the synchronized signals. To better understand the need to minimize the power variation that negatively impacts the conventional system, a brief discussion of the power system of satellite 209 is in order.

Figure 3:
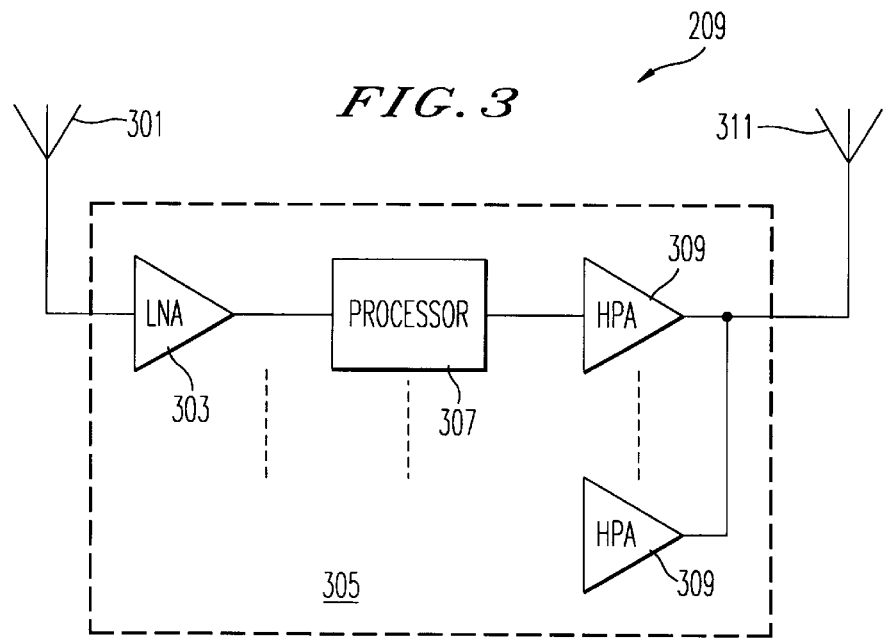
FIG. 3 is a diagram of the components of a satellite, according to the system of FIG. 2.

FIG. 3 show an exemplary communication satellite in the system of FIG. 2. Satellite 209 receives signals from gateway stations 201 and 203 as well as terminals 205 and 207 at received antenna 301, which then forwards the received signals to a low noise amplifier (LNA) 303 of a communication payload 305. Next, the amplified signal is transmitted to a processor 307, which performs, for example, channelization, routing, and beam forming functions. Processor 307 then outputs the signals to a high-power amplifier (HPA) 309. In an exemplary embodiment, HPA 309 is a solid-state power amplifier (SSPA). SSPAs are more fully described in U.S. Pat. No. 5,892,401 to Crampton et al., which is incorporated herein by reference. As indicated in FIG. 3, multiple LNAs, processors, and HPAs exist within the communication payload 305. After amplification by HPA 309, the transmit signals are sent to the transmit antenna 311. Performance of the satellite 209 is dictated largely by the behavior of HPA 309.

Figure 4A:
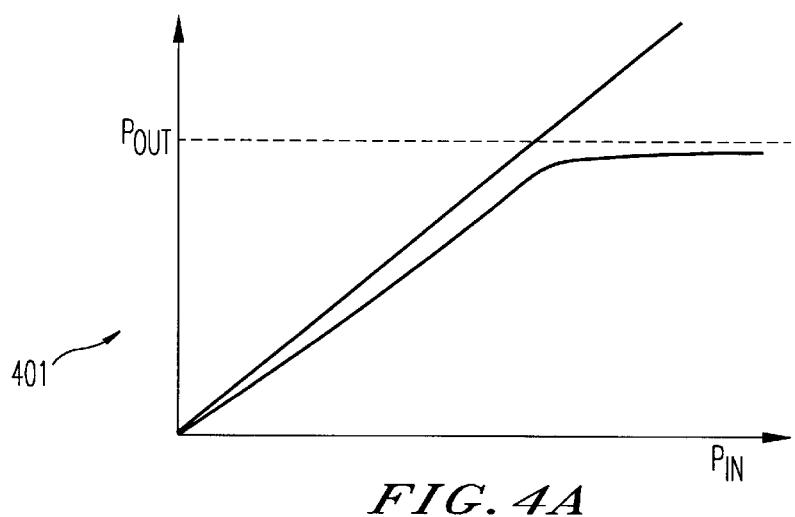
FIGS. 4A and 4B are graphs of the power characteristics of an amplifier utilized in the system of FIG. 2.
Figure 4B:
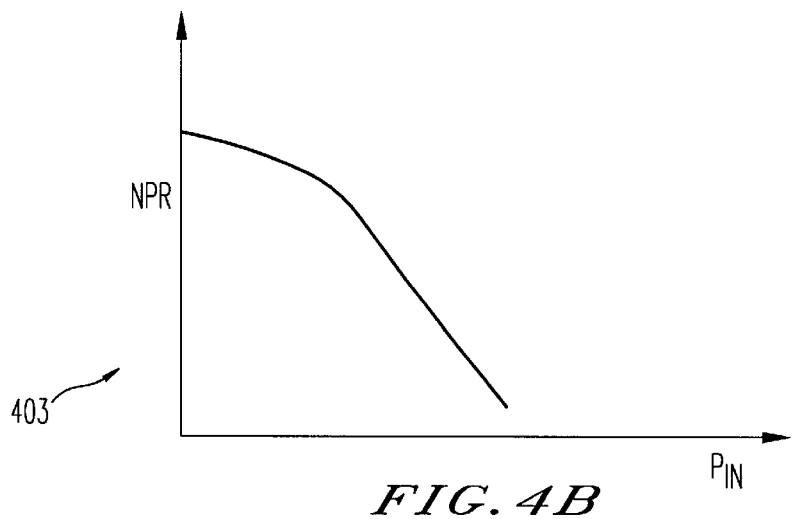

FIGS. 4A and 4B show the power characteristics and noise performance of the HPA 309. Graph 401 reveals the non-linearity of HPA 309. That is, beyond a certain input power ($P_{IN}$), the output power ($P_{OUT}$) exceeds a saturation point in which the HPA 309 operates in a non-linear region, whereby increasing $P_{IN}$ does not yield any appreciable increase in $P_{OUT}$. Under ideal conditions, HPA 309 should be driven as close to the saturation point as possible to maximize output power. However, as discussed previously, synchronized carriers have an average total power that varies ±1 dB, in which case if the amplifier 309 is driven near its saturation point, the ±1 dB variation would drive it further into saturation. At which time, the intermodulation interference more significantly distorts the output signals.

Graph 403 (FIG. 4B) illustrates the noise power ratio (NPR) characteristic of HPA 309. The NPR is basically a measure of an amplifier's non-linearity. As evident from the Graph 403, as HPA 309 is driven beyond saturation, the NPR dramatically decreases. In other words, beyond the saturation point, the HPA 309 introduces considerable noise into the transmit signals. It is clear, therefore, that the power variation of the receive signals should not drive HPA 309 beyond its saturation point, while at the same time, the maximum output power should be realized to support the largest possible traffic capacity.

Figure 5A:
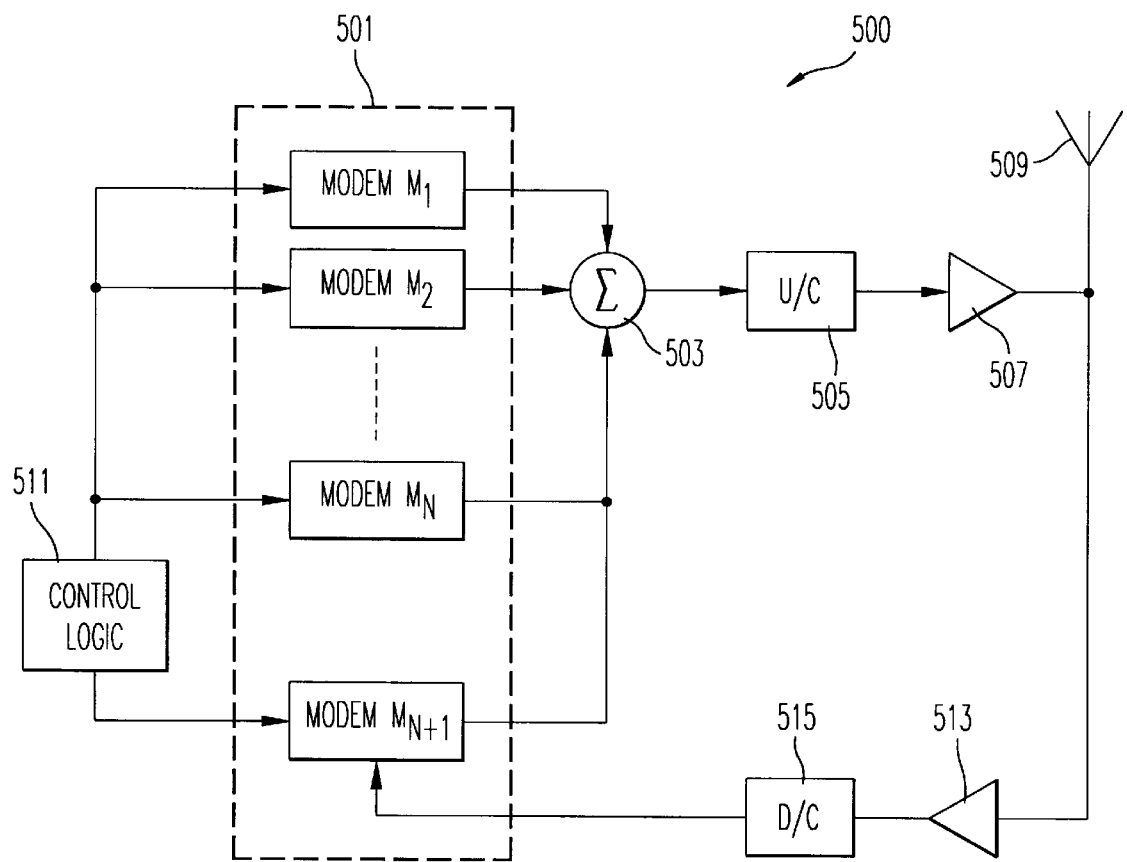
FIGS. 5A and 5B are diagrams of a gateway station and a terminal, respectively, in accordance with the system of FIG. 2.
Figure 5B:
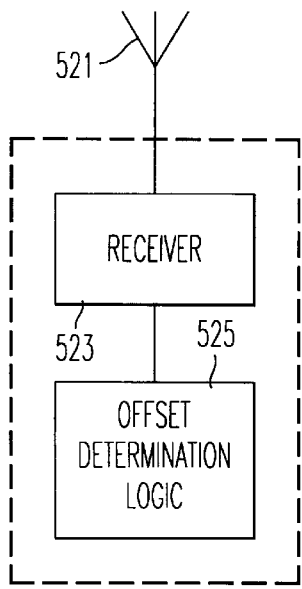
Figure 6A:
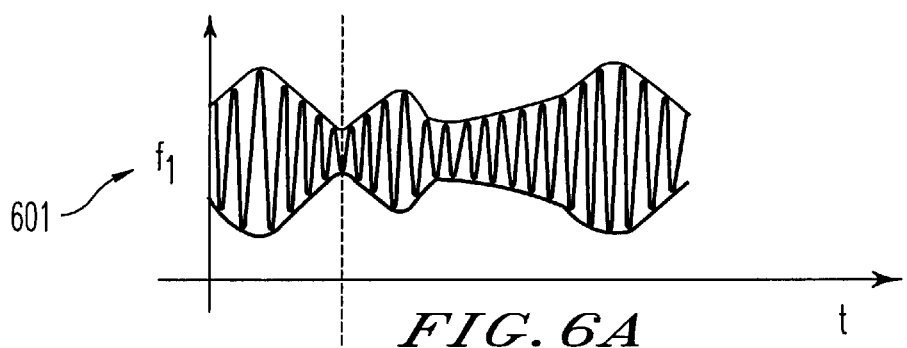
FIG. 6 is a diagram of the transmission signals as a result of the time-offset distribution operation, according to an embodiment of the present invention.
Figure 6B:
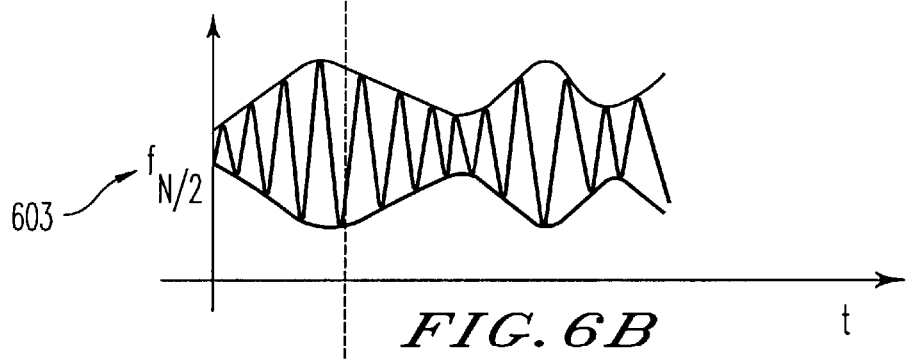
Figure 6C:
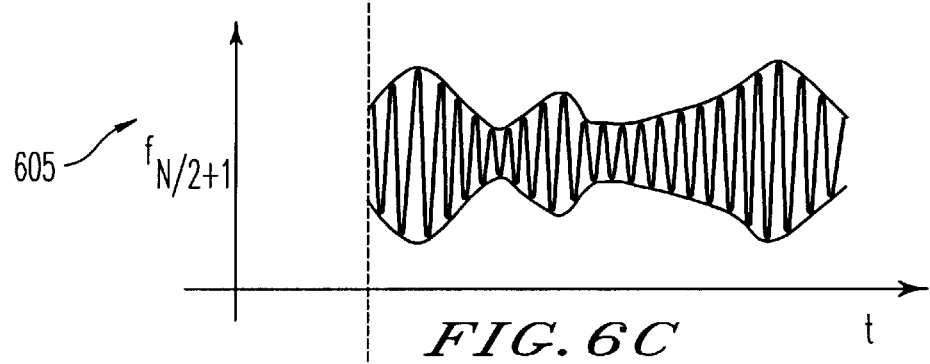
Figure 6D:
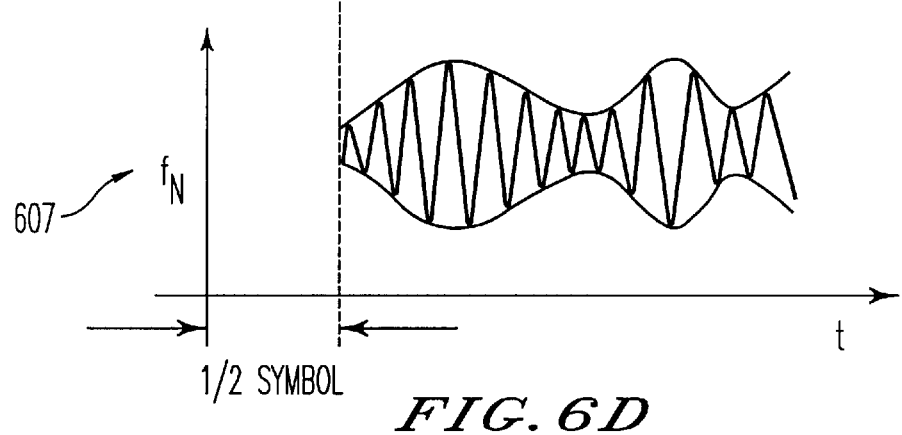

FIGS. 5A and 5B shows the components of a gateway station and the components of the terminal, respectively, in accordance with an embodiment of the present invention. As shown in FIG. 5A, gateway station 500 has a modem pool 501, which includes N+1 modems. These modems, in an exemplary embodiment, are FDMA (Frequency Division Multiple Access)/TDMA (Time Division Multiple Access) type modems. The N+1 modems 501 generate signals that are summed at a summing circuit 503. The aggregate signal is then transmitted to an upconverter (U/C) 505. Once upconverted, the signals are amplified by amplifier 507 and transmitted to satellite 209 (FIG. 2) via antenna 509.

According to one embodiment, gateway 500 employs a dedicated modem, $M_{N+1}$, for determination of the round trip delay time to satellite 209. The determination of the round trip delay from the gateway 500 to satellite 209 is necessary for adjusting the timing of the modems 501 so that the generated signals can be properly synchronized in time. The round trip delay time is computed by control logic 511, which instructs modem, $M_{N+1}$, to transmit a gateway frame reference (GFR) signal. It should be noted that control logic 511 can be implemented in hardware (e.g., IC (Integrated Circuit) circuit, ASIC (Application-Specific Integrated Circuit), etc.) and/or software. The GFR signal is summed with the other signals generated from modems 1-N at summing circuit 503.

The GFR signal from modem $M_{N+1}$ is then transmitted to satellite 209, which in turn transmits the GFR signal back to gateway 500 at antenna 509. The received GFR signal undergoes amplification at amplifier 513 and is downconverted with downconverter (D/C) 515. Upon receiving the return GFR signal, modem $M_{N+1}$ forwards the GFR signal to control logic 511, which computes the round trip delay time. Because the round trip delay time is now known, control logic 511 is able to synchronize the signals generated by modems 1-N. Unlike the conventional system, control logic 511 provides the capability to offset the transmission times of a portion of the modems in modem pool 501 based upon a predetermined distribution and an offset period. The operation of control logic 511 is better understood in light of FIG. 6, as explained below.

Terminals 205 and 207 of the satellite communication system 200 possess the functional capabilities to process the signals from the satellite 209 that has undergone the offset operation of the gateway stations 201 and 203. FIG. 5B shows a terminal (e.g., 205 and 207), which includes an antenna 521 that receives the signal from the satellite 209. A receiver 523, coupled to the satellite 209, processes the received signal and forwards the signal to an offset-determination logic 525. The offset determination logic 525 identifies whether the received signal is offset based upon an initial call establishment message (i.e., assignment message) that has a control flag field for specifying the offset or lack thereof; the call establishment procedure is discussed below in FIGS. 8A and 8B. For example, once the offset-determination logic 525 detects that the communication utilizes offset signals from the initial call establishment phase, the receiver is alerted that subsequent received signals associated with the established communication channel are offset. As with the control logic 511 of the gateway stations 201 and 203, the offset-determination logic 525 can be implemented in hardware and/or software.

FIG. 6 shows transmission signals based upon the offset distribution operation of the control logic 511, in accordance with an embodiment of the present invention. In an exemplary embodiment the predetermined distribution specifies that approximately half of the generated synchronized signals from the modems 501 are offset. For example, assuming that gateway station 500 utilizes 1,000 modems, half of the modems, e.g., modems 1–500, are controlled by control logic 511 to generate synchronized signals that are not offset. The control logic 511, however, instructs the remaining modems, e.g., modems 500–1,000, to produce synchronized signals that are offset, which according to one embodiment is half a symbol period. The predetermined distribution can vary depending on the exact number of modems utilized; the key factor is that the variation of the total average power is minimized. In other words, the predetermined distribution can be set so that a tolerable amount of variation results. For example, 400 modems of the modem pool 501 can be offset, while the other portion of the modem pool 501 (i.e., 600 modems) are not, assuming 400 offset signals can produce a power variation that is negligible with respect to the particular SSPA (e.g., HPA 309) within the satellite 209. In the example at FIG. 6, graph 601 corresponds to modem 1 of gateway 500. In the generic case, graph 603 corresponds to modem $M_{N/2}$, while graph 605 shows the carrier associated with modem $M_{N/2+1}$. As previously noted, the carrier of modem $M_{N/2+1}$ is offset by half a symbol according to an embodiment of the present invention. Similarly, the carrier of modem $M_N$ is offset by half a symbol, as shown in graphs 605 and 607. It should be noted that the envelopes of the carriers shown in graph 601, 603, 605, and 607 are of no consequence to the total power variation because the effect of transmitting hundreds or thousands of such signals simultaneously is to perform an averaging function such that the synchronized signals exhibit a sinusoidal variation in total average power; assuming non-constant envelope modulation is used and synchronization at the satellite 209 is accuracy and within a time that is much less than a symbol. To ensure constant transmit power, transmit times are selected by control logic 511 to match the profile of the average power variation. The sinusoidal nature of power variation over a symbol period implies that using simply two transmit time options suffices to smooth the total power profile. That is, if half of the traffic is offset by half a symbol (e.g., 21.5 µs), then the total power would be close to constant. This principle is shown with a specific example in FIGS. 7A and 7B.

Figure 7A:
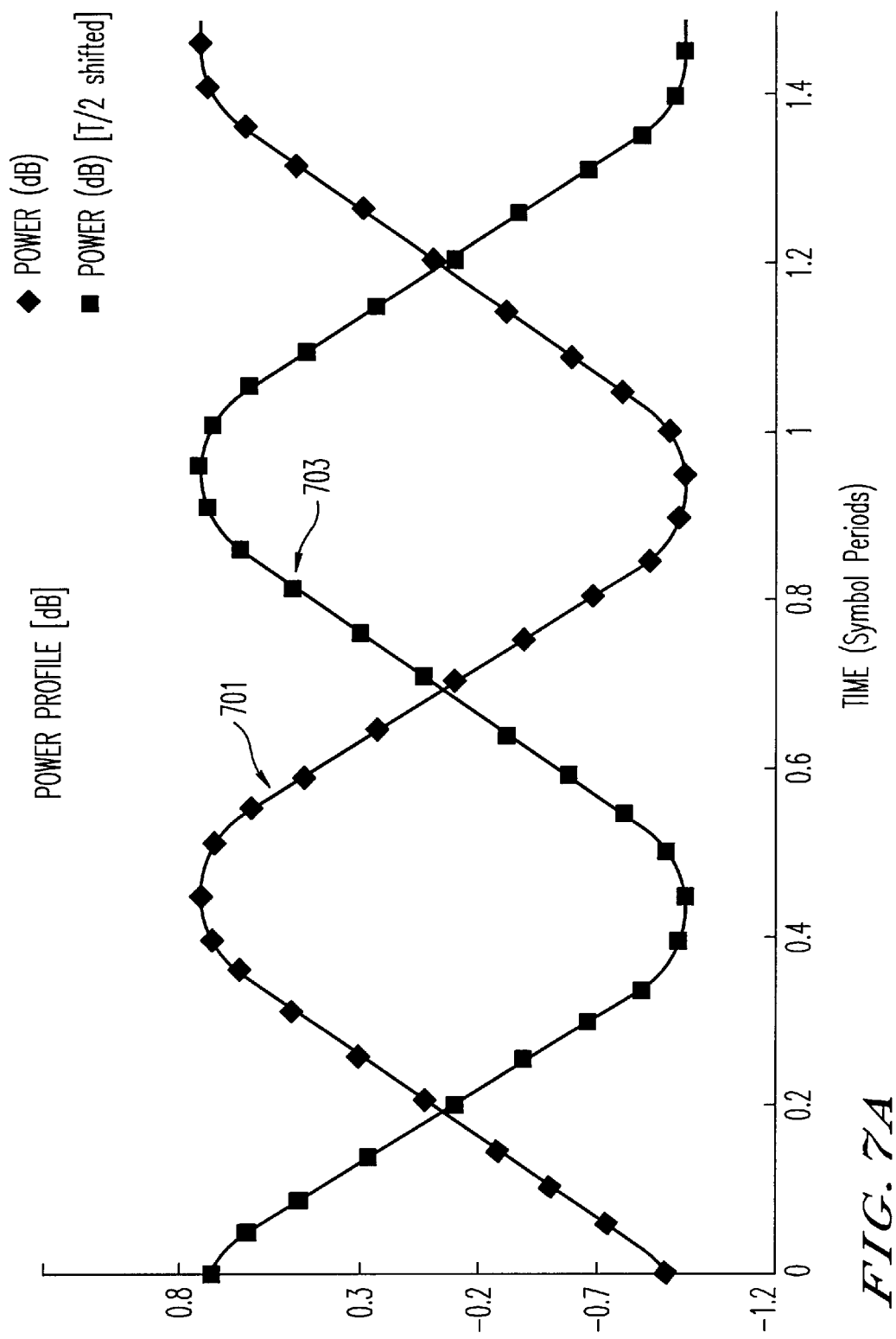
FIGS. 7A–7C are charts of pi./4-QPSK (Quadrature Phase Shift Keying) signals in which a portion of the signals have been offset by half a symbol period, according to an embodiment of the present invention.
Figure 7B:
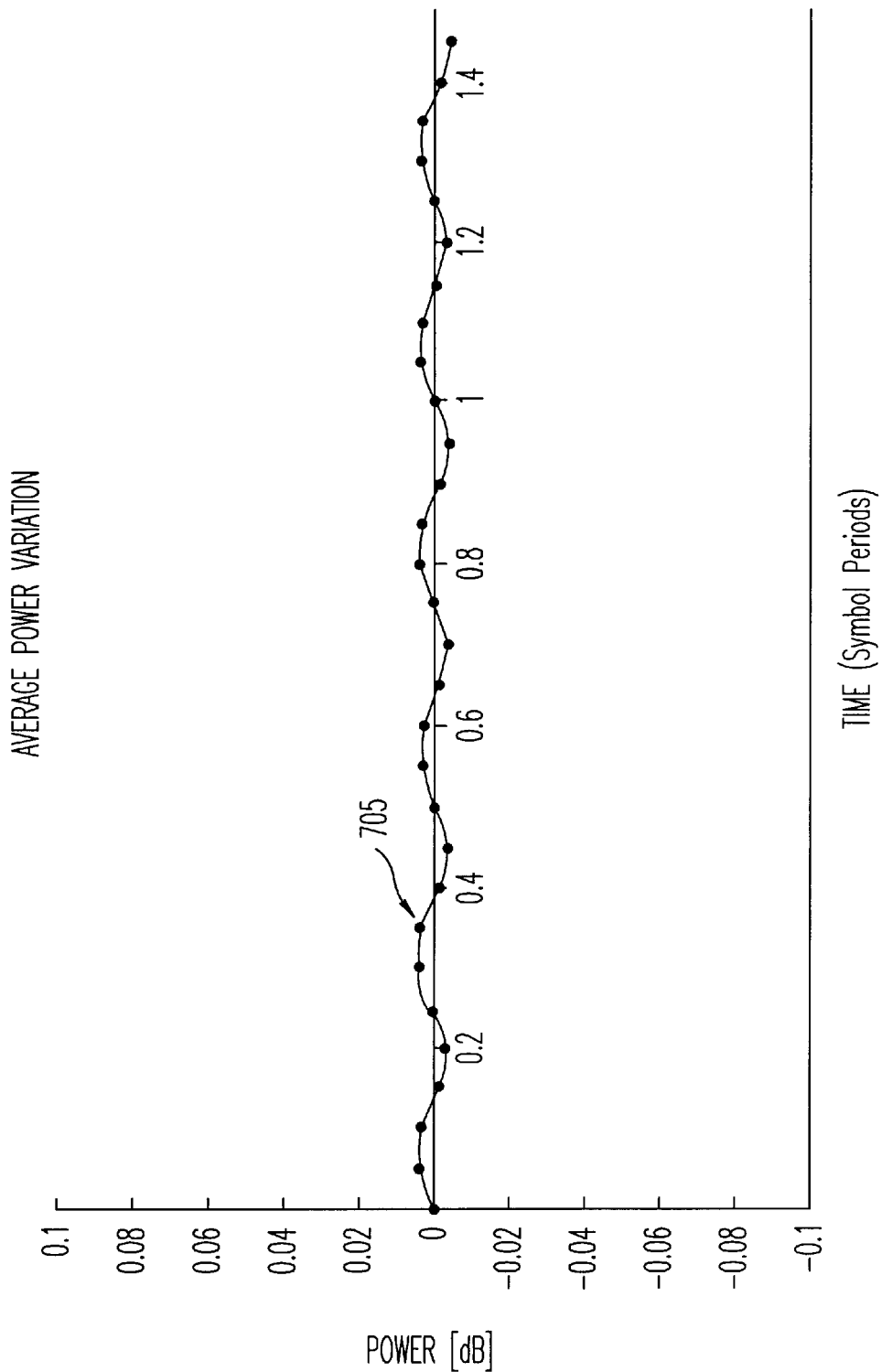
Figure 7C:
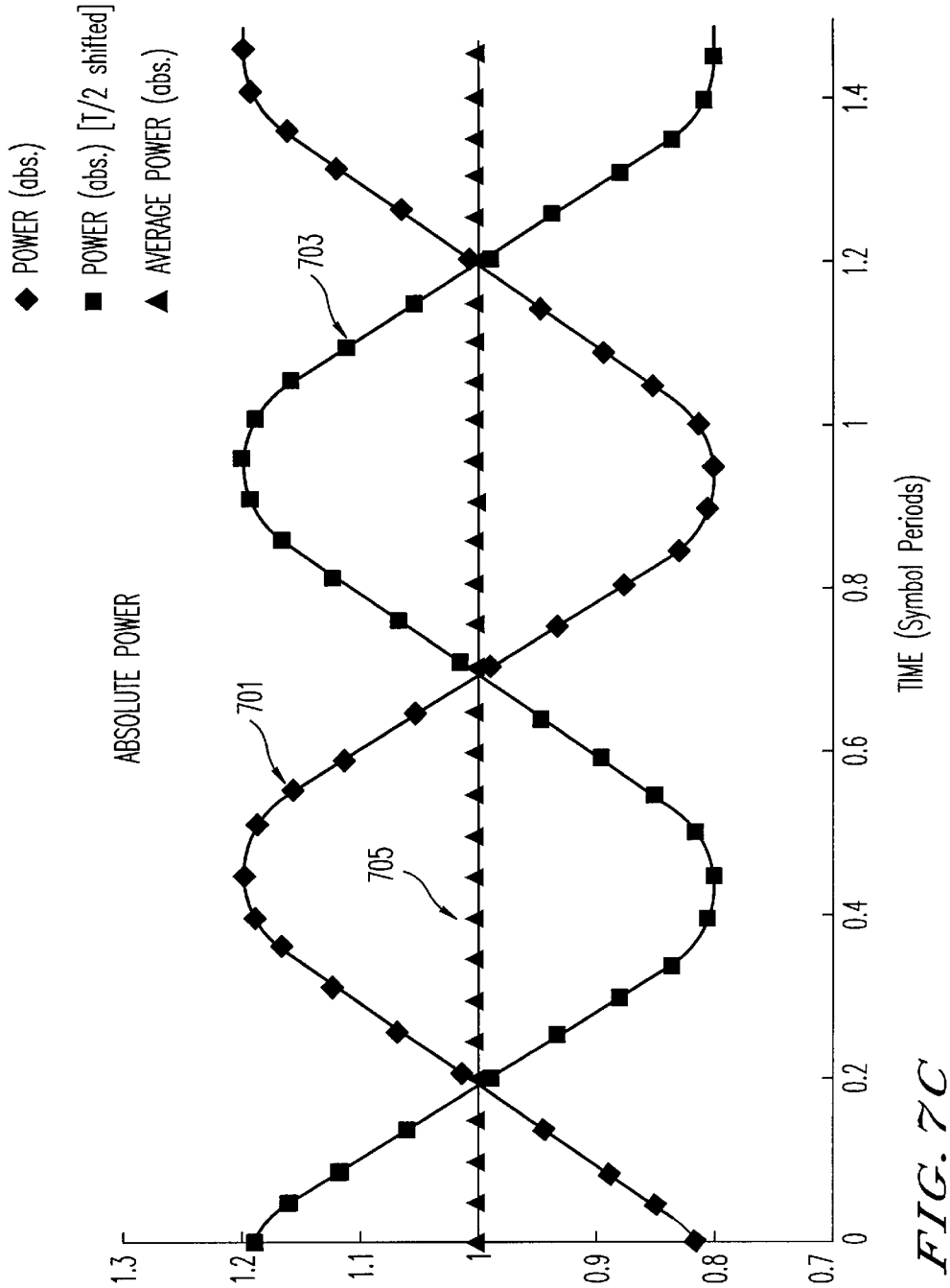

FIGS. 7A–7C are graphs of the power variation during one symbol period in which pi./4-QPSK (Quadrature Phase Shift Keying) signaling is employed, according to an embodiment of the present invention. As seen in FIG. 7A, the power associated with an individual, aggregate pi./4-QPSK signal varies considerably when random data is modulated. An aggregate pi./4-QPSK signal represents an average of all the pi./4-QPSK signals with a common offset (which could be no offset or by a predetermined offset period). The aggregate pi./4-QPSK signal 701 (as denoted by diamond shaped points) exhibits a sinusoidal average power which peaks at about 0.8 dB down to below –0.7 dB. Signal 703 is offset by half a symbol, as denoted by the line with square points (FIG. 7A). The resultant power of aggregate signals 701 and 703 is shown in FIG. 7B; effectively, the total average power signal 705 is approximately constant throughout the entire symbol period. FIG. 7C provides a graph showing all the signals of FIGS. 7A and 7B.

Although FIGS. 7A–7C describe the results of the offsetting technique with respect to pi./4-QPSK, one of ordinary skill in the art would recognize that other signaling schemes can be employed; for example, .BPSK (Binary Phase Shift Keying), of OQPSK (Offset Quadrature Phase Shift Keying).

The above behavior is made possible by control logic 511 which offsets a portion of the total synchronized signals as to minimize the power variation of the aggregate signal.

Accordingly, the control logic 511 advantageously provides a relatively simple mechanism to enhance satellite communication efficiency. It should be noted that the need to obtain an equal distribution of offset signals versus those that are not offset exists only when the satellite 209 is approaching its power limits. Through this offsetting technique, the total gain and performance of satellite 209 is in the order of 0.2 dB, which is substantial when considering that a power limited satellite that is capable of supporting, for example, 20,000 telephone calls, translates into a gain in capacity of over 900 calls.

Although the above discussion focused on a gateway 500, the terminals 205 and 207 of the satellite communication system 200 (FIG. 2) need to be aware that the signals are offset. As mentioned previously, terminals 205 and 207 employ the GSM protocol to communication within the system 200.

GSM is a global standard that is promulgated by the ETSI for digital cellular communication. The GSM protocol employs a combination of Time- and Frequency-Division Multiple Access (TDMA/FDMA) to support multiple users. The FDMA component divides a 25 MHz bandwidth (maximum) into 124 carrier frequencies spaced 200 kHz apart, in which one or more carrier frequencies are assigned to each gateway station. These carrier frequencies are then divided in time with a TDMA scheme. The TDMA scheme utilizes burst periods within a TDMA frame; each burst period lasts 15/26 ms.

Channels are defined by the number and position of their corresponding burst periods. A traffic channel (TCH) is used to carry speech and data traffic. Traffic channels are defined using a 26-frame multiframe (or group of 26 TDMA frames), which has a length of 120 ms. Out of the 26 frames, 24 frames are used for traffic; and one of the remaining frames is designated for the Slow Associated Control Channel (SACCH). The GSM protocol specification defines these full-rate TCHs, as well as half-rate TCHs defined, although they are not yet implemented. Half-rate TCHs can double the capacity of a system with appropriate speech encoding. Eighth-rate TCHs are also specified, and are used for signalling; the GSM protocol specification employs these eighth-rate TCHs as Stand-alone Dedicated Control Channels (SDCCH).

Common channels are defined within a 51-frame multiframe, and include a Random Access Channel (RACH), and an Access Grant Channel (AGCH). Random Access Channel (RACH) is used by a terminal to request access to a communication channel within the satellite communication system 200. The Access Grant Channel (AGCH) is used to allocated a SDCCH to a terminal for signalling (in order to obtain a dedicated channel) in response to a request on the RACH. A call establishment by a terminal (e.g., 205 and 207) is shown in FIG. 8A.

Figure 8A:
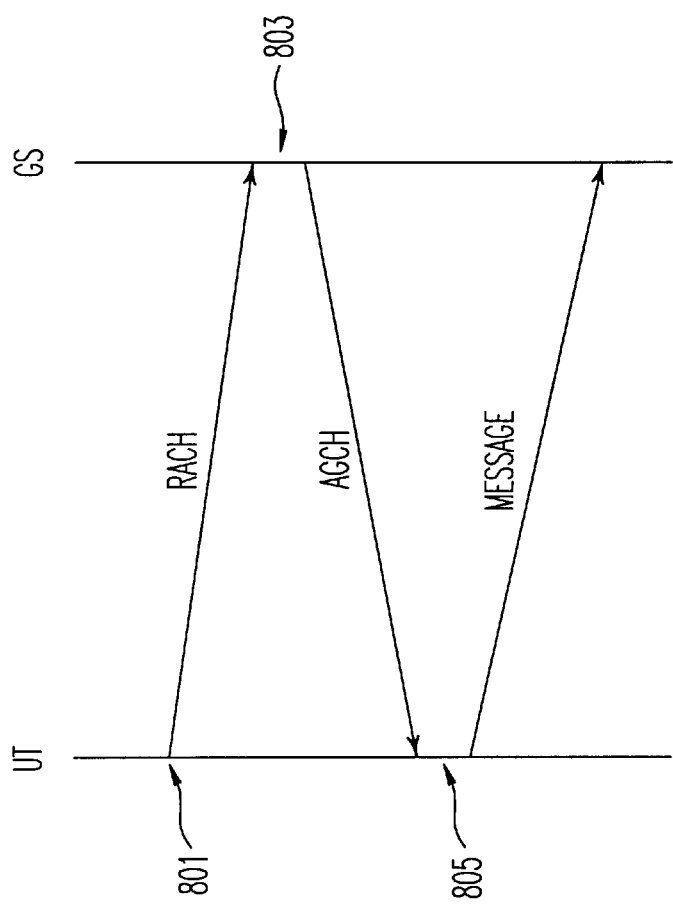
FIG. 8 is a diagram of the call establishment operation that designates whether an offset is imposed, in accordance with an embodiment of the present invention.

FIG. 8A shows a diagram of the call establishment operation that designates whether an offset is imposed using the GSM protocol, in accordance with an embodiment of the present invention. Initially, a user terminal (UT) requests service from a gateway station by transmitting a random access burst (i.e., call establishment request message) over a random access channel (RACH), per step 801. Upon receipt of information over the RACH channel, the gateway station transmits information relating to the granting of access to the user terminal. The information transmitted within the AGCH channel involves assignment of a traffic carrier frequency (i.e., traffic channel) as well as a control flag to indicate whether the carrier is offset, per step 803. After retrieving information off the AGCH channel, the user terminal, as in step 805, begins transmitting messages over the assigned traffic channel. All assignments on the same carrier use the same offset, which ensures that the guard time between bursts is not reduced because of the offset. For some link types (e.g., terminal-to-terminal), the satellite 209 applies time-slot separation of the transmissions. As such, the time offsets reduce the guard time relative to the time window in the satellite by a ¼ of a symbol, which falls within an acceptable guard-time and has negligible impact on performance of the satellite communication system 200.

Figure 8B:
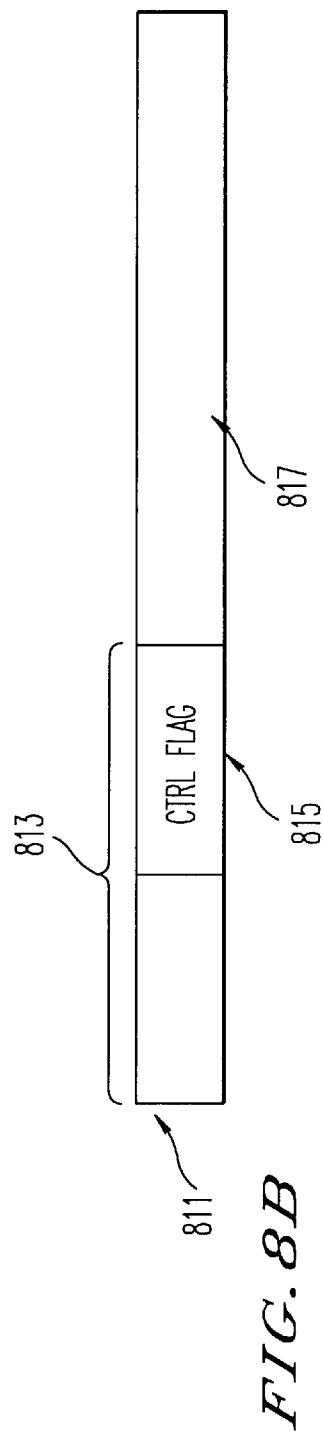

FIG. 8B shows the data structure of an assignment message, in accordance with an embodiment of the present invention. Assignment message 811 is transmitted over the AGCH from the gateway station to the terminal. The assignment 811 has a header field 813 with a control flag 815, which specifies whether the carrier is offset. A control data field 817 is also included within the GSM packet 811. The length of the control flag 815, according to one embodiment of the present invention, is a single bit; in which a "0" denotes no offset and a "1" denotes an offset. It is recognized by one of ordinary skill in the art that the length of the control flag 815 can be set to any number of bits, depending on the particular application.

Figure 9:
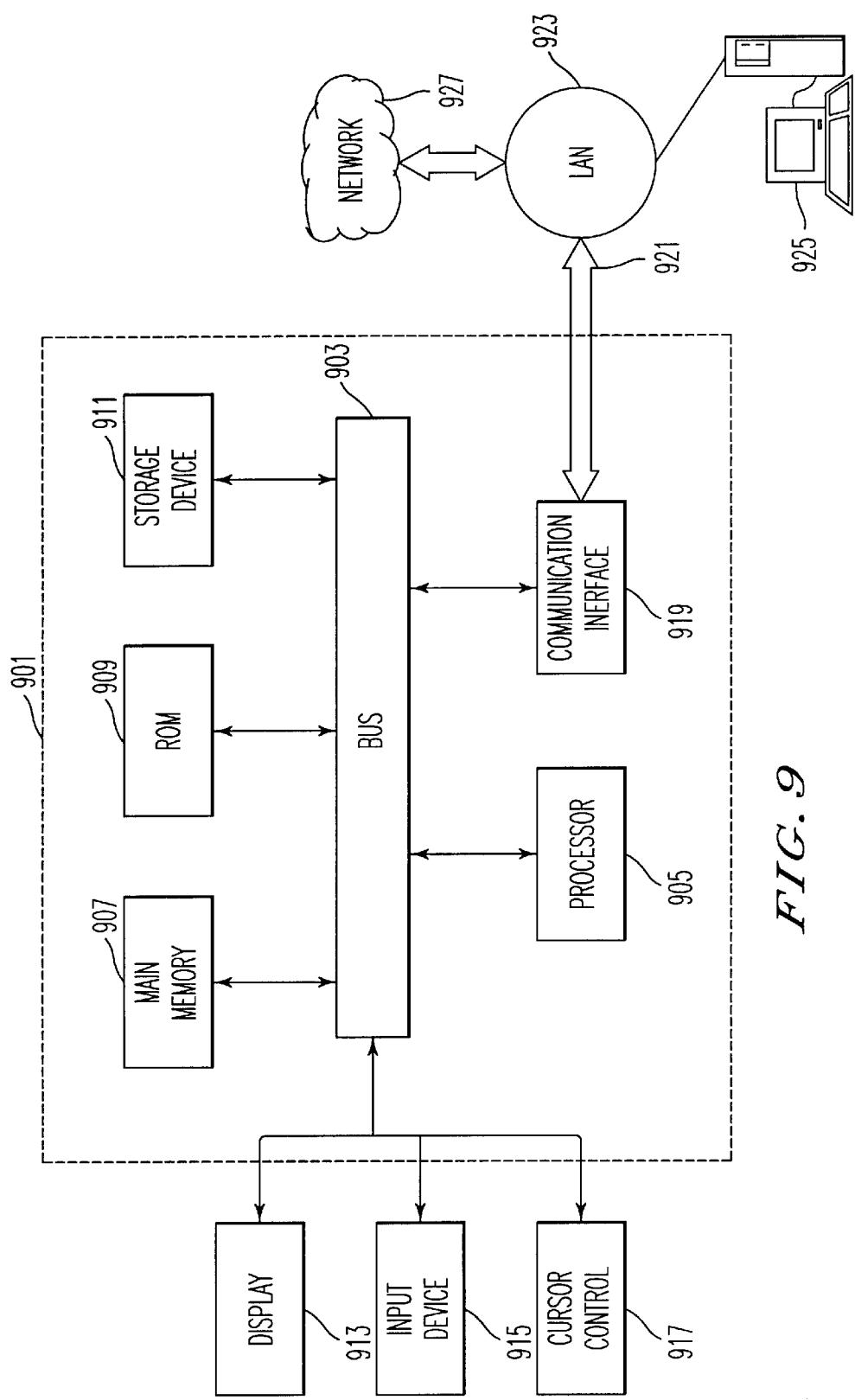
FIG. 9 is a diagram of a computer system that can control the time-offset distribution operation, in accordance with an embodiment of the present invention.

FIG. 9 illustrates a computer system 901 upon which an embodiment according to the present invention may be implemented to control the offset operation of the signal sources (e.g., modem pool). Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, mapping a set of object life cycle states to one or more sets of business rules is provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the control logic to perform the offset operation may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to providing increased system capacity and efficiency of a satellite communication system by ensuring that constant power is delivered to the satellite. A control logic within the gateway station (or terminal) controls the generation of synchronized signals from multiple signal sources (e.g., modems) by offsetting approximately half the synchronized signals by half a symbol period. The offset operation yields an average total power signal that minimizes the sinusoidal variation that attends the conventional system. The present invention further provides the capability to notify the terminals within the satellite communication system by employing a control flag that indicates whether a carrier is offset.

Obviously, numerous modifications and variations of the present invention are possible in light of the above teachings. It is therefore to be understood that within the scope of the appended claims, the invention may be practiced otherwise than as specifically described herein.

What is claimed is:

1. A method of minimizing variation in transmit power in a satellite communication system, the method comprising:

generating a plurality of synchronized signals; and minimizing the variation in the transmit power by selectively offsetting transmission times of a portion of the plurality of synchronized signals.

2. The method according to claim 1, wherein the selectively offsetting is performed according to a predetermined distribution and an offset period.

3. The method according to claim 2, wherein the predetermined distribution specifies about half the plurality of synchronized signals.

4. The method according to claim 2, wherein the offset period in the selectively offsetting is half a symbol period.

5. The method according to claim 4, wherein the symbol period is about 43 $\mu$s.

6. The method according to claim 1, wherein the selectively offsetting is performed by a control logic and the generating is performed by a plurality of signal sources corresponding to the synchronized signals.

7. The method according to claim 1, wherein the generating is performed by a plurality of modems.

8. The method according to claim 1, further comprising:

summing the plurality of synchronized signals;

upconverting the summed synchronized signals;

outputting an upconverted signal; and amplifying the upconverted signal for transmission to a communication satellite.

9. The method according to claim 8, wherein the amplifying step is performed by a solid-state power amplifier.

10. The method according to claim 1, further comprising:

generating an assignment message having a control flag field, the assignment message corresponding to one of the plurality of synchronized signals; and selectively setting the control flag field based upon determining whether to offset the one synchronized signal.

11. The method according to claim 10, wherein the assignment message in the step of generating the assignment message conforms with a GSM protocol.

12. The method of claim 1, wherein the minimizing the variation comprises selecting the transmission times to match a profile of an average power variation.

13. A gateway station system for communicating with a communication satellite, comprising:

a plurality of signal sources configured to generate synchronized signals; and a control logic coupled to the plurality of signal sources and configured to minimize a power variation in transmission power by offsetting select transmission times of a portion of the synchronized signals.

14. The system according to claim 13, wherein the control logic offsets according to a predetermined distribution and an offset period.

15. The system according to claim 14, wherein the predetermined distribution specifies about half the number of the plurality of the synchronized signals.

16. The system according to claim 14, wherein the offset period is half a symbol period.

17. The system according to claim 16, wherein the symbol period is about 43 $\mu$s.

18. The system according to claim 13, wherein the plurality of signal sources are modems.

19. The system according to claim 13, further comprising:

a summing circuit coupled to the plurality of signal sources and configured to combine the synchronized signals;

an upconverter configured to receive the summed synchronized signals and to output an upconverted signal; and an amplifier configured to amplify the upconverted signal for transmission to the communication satellite.

20. The system according to claim 19, wherein the amplifier is a solid-state power amplifier.

21. The system according to claim 13, wherein one of the plurality of signal sources generates an assignment message having a control flag field to specify whether a corresponding synchronized signal is offset.

22. The system according to claim 21, wherein the assignment message conforms with a GSM protocol.

23. The gateway station system of claim 13, wherein the control logic is configured to selectively offset the transmission times to match a profile of an average power variation.

* * * * *